US 8,056,439 B2

(12) United States Patent
Fukui et al.

(10) Patent No.: US 8,056,439 B2
(45) Date of Patent: Nov. 15, 2011

(54) DEVICE TO MOUNT CONTROL LEVER TO BICYCLE

(75) Inventors: Seiji Fukui, Shimonoseki (JP); Kenji Nakahara, Kawachinagano (JP)

(73) Assignee: Shimano Inc., Osaka (JP)

( * ) Notice: Subject to any disclaimer, the term of this patent is extended or adjusted under 35 U.S.C. 154(b) by 59 days.

(21) Appl. No.: 11/935,867

(22) Filed: Nov. 6, 2007

(65) Prior Publication Data
US 2009/0114057 A1 May 7, 2009

(51) Int. Cl.
B62K 23/02 (2006.01)
F16B 13/06 (2006.01)

(52) U.S. Cl. ........ 74/502.2; 74/489; 74/551.1; 403/370; 411/27; 411/28

(58) Field of Classification Search ............... 74/551.1, 74/502.2, 489, 488, 473.14, 502.4, 502.6, 74/551.3, 551.4; 403/118, 370; 188/24.11; 411/24, 27, 45, 49, 77, 80
See application file for complete search history.

(56) References Cited

U.S. PATENT DOCUMENTS

| 683,082 | A | * | 9/1901 | Summerer | 411/28 |
| 1,349,437 | A | * | 8/1920 | Royer | 411/24 |
| 1,526,681 | A | | 2/1925 | Round | |
| 4,020,735 | A | * | 5/1977 | Herback | 411/26 |
| 4,462,267 | A | * | 7/1984 | Shimano | 74/489 |
| 5,285,696 | A | * | 2/1994 | Taylor | 74/551.1 |
| 5,657,670 | A | * | 8/1997 | Lin | 74/551.1 |
| 7,240,772 | B2 | | 7/2007 | Tsai | |
| 2006/0266594 | A1 | | 11/2006 | Tsai | |
| 2007/0175290 | A1 | * | 8/2007 | Fujii | 74/502.2 |

FOREIGN PATENT DOCUMENTS

| DE | 502132 | 7/1930 |
| DE | 3724427 | 2/1989 |
| EP | 1582452 | 10/2005 |
| FR | 663073 | 8/1929 |
| FR | 884159 | 8/1943 |
| GB | 140267 | 3/1920 |
| JP | 49-000642 U | 1/1974 |
| JP | 61-183793 U | 11/1986 |
| JP | 63-192195 U | 12/1988 |
| JP | 1-080590 U | 5/1989 |

* cited by examiner

Primary Examiner — James Pilkington
Assistant Examiner — Thomas Diaz
(74) Attorney, Agent, or Firm — Ditthavong Mori & Steiner, P.C.

(57) ABSTRACT

A device to mount a control lever to a bicycle handlebar includes a bracket, an expanding bolt, and a fixing member. The bracket is configured to be connected to the control lever and includes an inlet opening with a center axis, a first tapered portion extending along an axial direction, and at least one tapered outer serration formed on the first tapered portion. The expanding bolt includes a tubular portion and a second tapered portion extending along the axial direction. The tubular portion includes an outer threaded surface. The fixing member is disposed on the tubular portion of the expanding bolt. The first and second tapered portions are configured to operate so as to push the fixing member against an inner surface of the bicycle handlebar when the device is mounted to the bicycle handlebar.

17 Claims, 12 Drawing Sheets

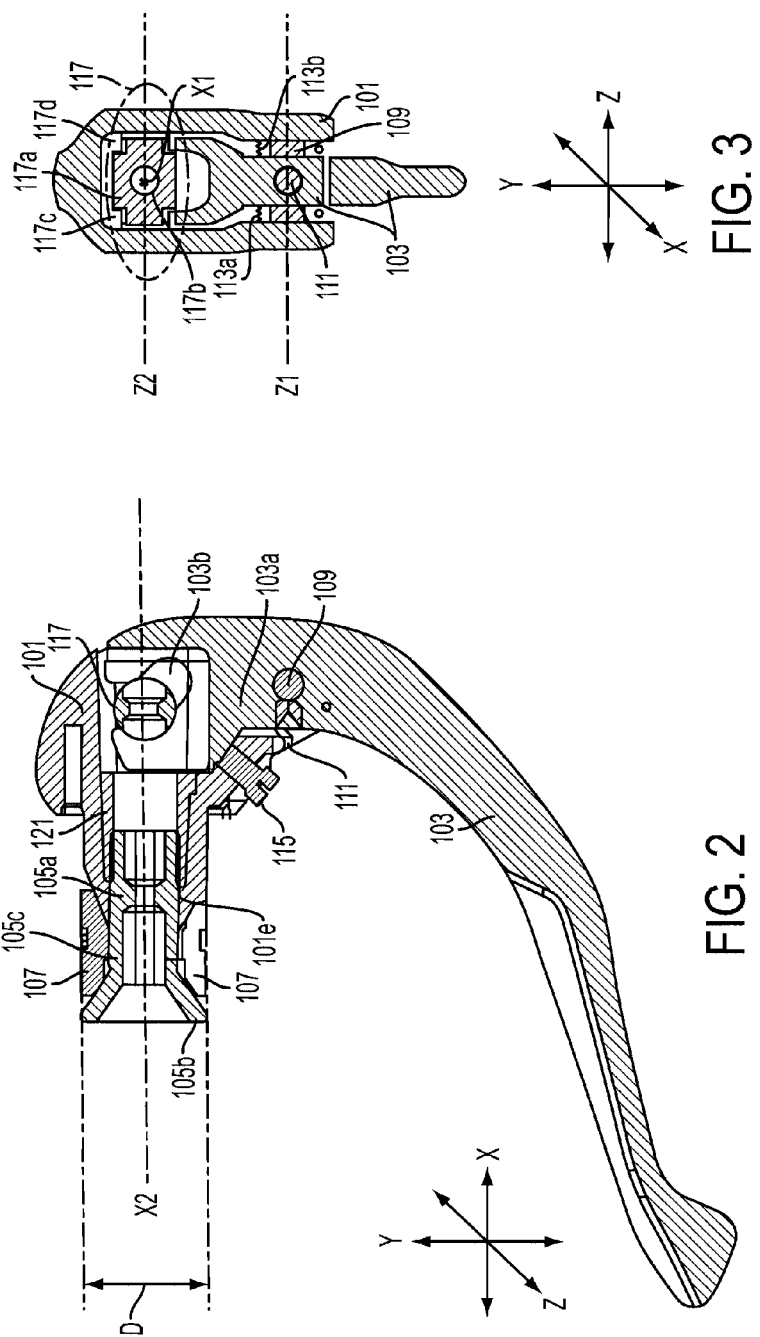

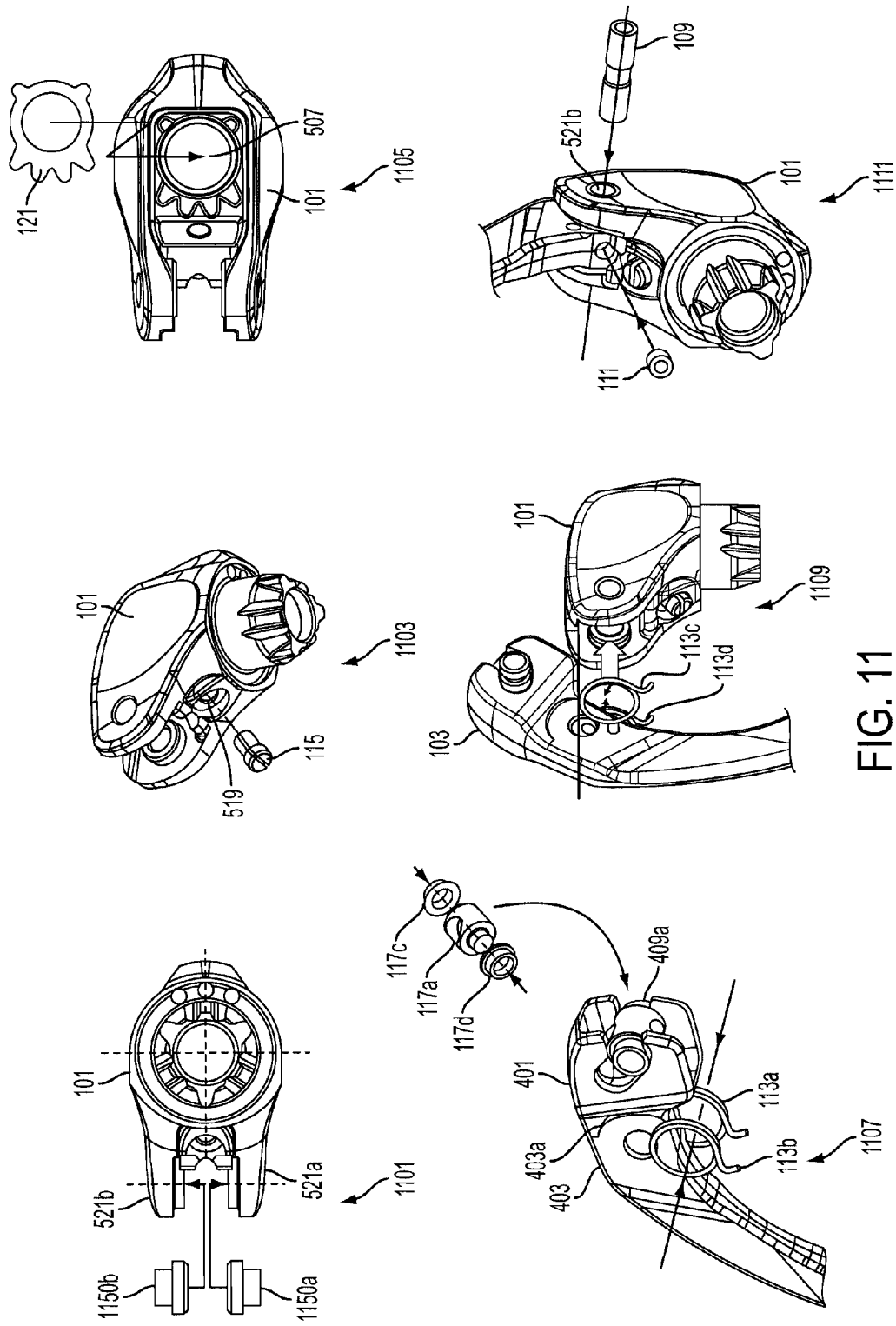

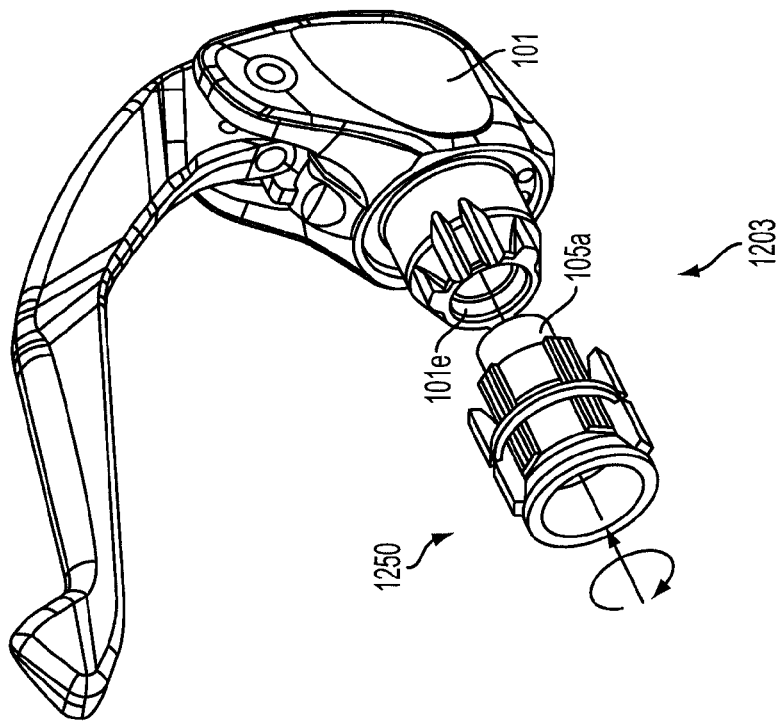
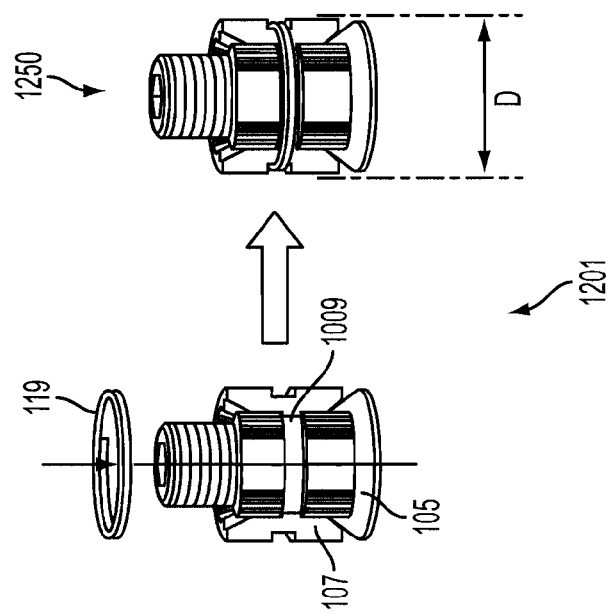
FIG. 12

DEVICE TO MOUNT CONTROL LEVER TO BICYCLE

BACKGROUND OF THE INVENTION

1. Field of the Invention

The present invention relates to a device to mount a control lever to a bicycle handlebar.

2. Discussion of the Background

U.S. Pat. No. 7,240,772 discloses an embedding typed handbrake apparatus configured to be installed in an end section of a bicycle handlebar. The contents of this patent are incorporated herein, by reference, in their entirety. This handbrake apparatus includes an operating lever pin-joined to a positioning seat that is sequentially joined to a stopping ring, a spring, and a locking seat through a locking bolt. A first end of a brake sleeve is thread into the body of the bicycle handlebar, via a cable entrance hole, and is fixed to the locking seat. A second end of the brake sleeve is coupled to a brake assembly mounted to a wheel of the bicycle. A brake wire is thread through the operating lever, via an axial through hole of the locking bolt, and inserted into the brake sleeve. The brake wire passes through the brake sleeve and connects to the brake assembly. As such, actuation of the operating lever causes a tension within the brake wire to increase or decrease. Variation of the tension manipulates the brake assembly.

SUMMARY OF THE INVENTION

According to one aspect of the present invention, a device to mount a control lever to a bicycle handlebar includes a bracket, an expanding bolt, and a fixing member. The bracket is configured to be connected to the control lever and includes an inlet opening with a center axis, a first tapered portion extending along an axial direction, and at least one tapered outer serration formed on the first tapered portion. The expanding bolt includes a tubular portion and a second tapered portion extending along the axial direction. The tubular portion includes an outer threaded surface. The fixing member is disposed on the tubular portion of the expanding bolt. The first and second tapered portions are configured to operate so as to push the fixing member against an inner surface of the bicycle handlebar when the device is mounted to the bicycle handlebar.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a sectional view of the control apparatus of FIG. 1(B) taken along a line II-II;

FIG. 3 is a sectional view of the control apparatus of FIG. 1(A) taken along a line III-III;

FIG. 11 schematically illustrates a process for assembling the control lever of FIGS. 4(A) and 4(B) to the bracket assembly of FIGS. 5(A) and 5(B);

FIG. 12 schematically illustrates a process for assembling one or more fixing members of FIGS. 10(A) and 10(B) to the assembly of FIG. 11, via expanding bolt of FIGS. 8(A) and 8(B);

DESCRIPTION OF THE EMBODIMENTS

Figure 1B:
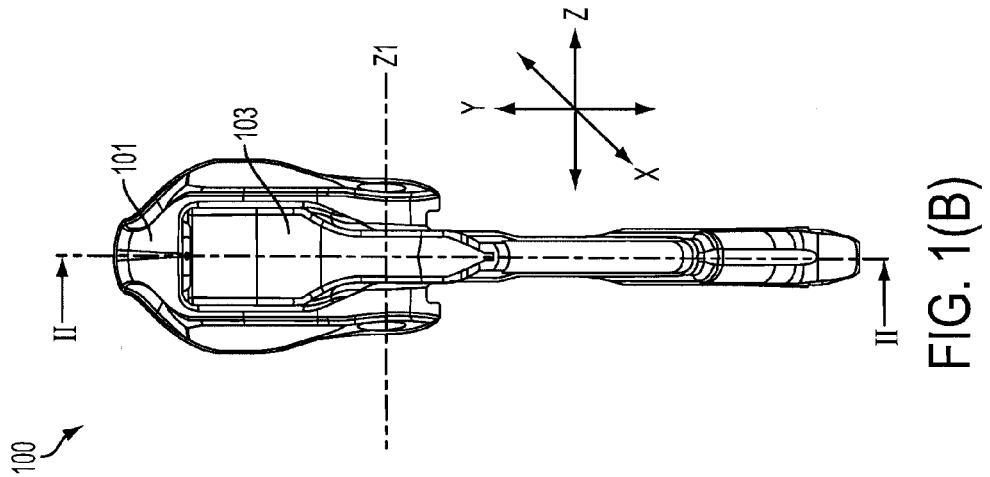
FIGS. 1(A) and 1(B) are schematic views of a control apparatus, according to an embodiment of the present invention.

The embodiments will now be described with reference to the accompanying drawings, wherein like reference numerals designate corresponding or identical elements throughout the various drawings.

Figure 1A:
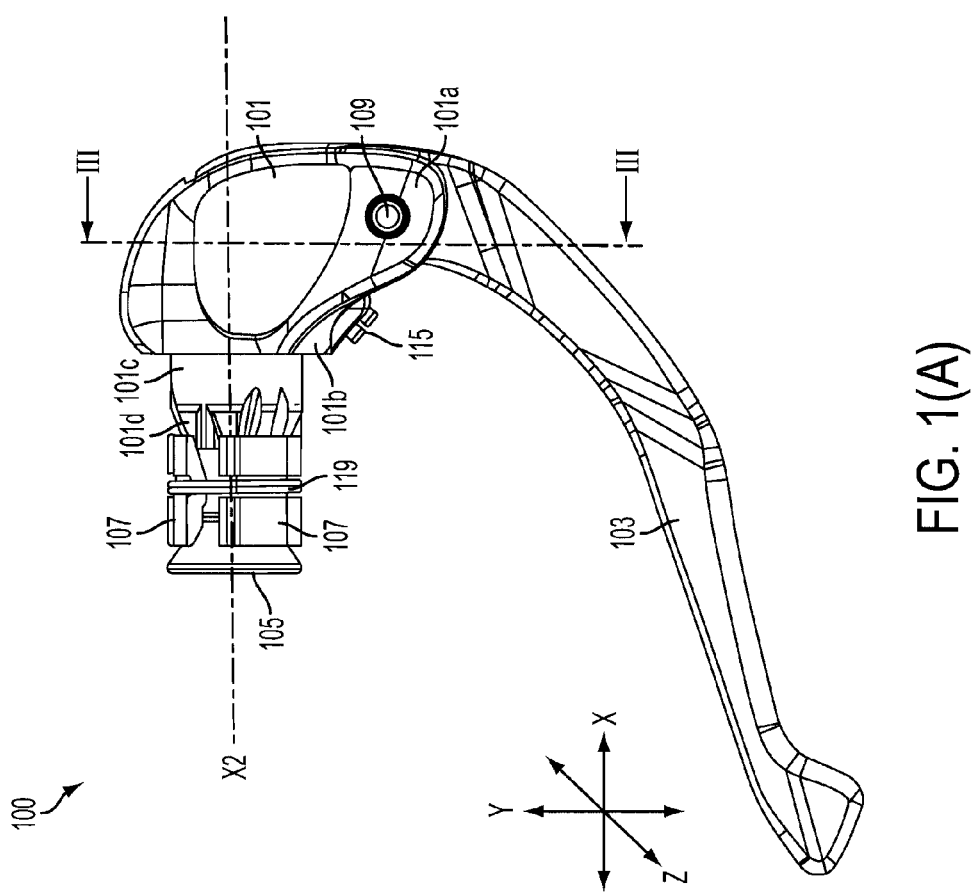

FIGS. 1(A) and 1(B) are schematic views of a control apparatus 100, according to an embodiment of the present invention. FIGS. 2 and 3 are sectional views of control apparatus 100 taken along lines II-II and III-III respectively. In one particular implementation, control apparatus 100 is configured to actuate a conventional bicycle brake system (not shown), such as a caliper, disc, or drum brake system. While specific reference will be made thereto, it is to be appreciated that the present invention also finds application in other vehicles, such as tricycles, motorcycles, etc., as well as in other control lever actuated systems, such as gear shift systems.

Referring now to FIGS. 1-3, a bicycle brake control apparatus 100 roughly forms a backwards "J" shape and includes a bracket assembly 101, a control lever 103, an expanding bolt 105, and one or more fixing members 107. A pin 109 and a fixing screw 111 detachably couple control lever 103 to a trailing portion 101a of bracket assembly 101. In this manner, control lever 103 may pivot about an imaginary center axis Z1 of pin 109 that is parallel to an imaginary Z-axis. Torsion springs 113a and 113b are anchored between control lever 103 and bracket assembly 101 to bias control lever 103. As such, when control lever 103 is compressed, i.e., pivoted in a clockwise fashion about center axis Z1, torsion springs 113a and 113b create an apposing counterclockwise torsion force, such that when control lever 103 is, for example, released, control lever 103 returns to the depicted resting position.

A screw 115 can be "screwed" into a lower portion 101b of bracket assembly 101 such that a trailing end may protrude into an inner cavity of bracket assembly 101 and abut against an end portion 103a of control lever 103. In this manner, a resting position adjustment mechanism is formed. Namely, by adjusting the amount by which screw 115 protrudes into the inner cavity region, the resting position of control lever 103 may be defined and/or modified. Control lever 103 is more fully described with respect to FIGS. 4(A) and 4(B), while bracket assembly 101 is explained in more detail in accordance with FIGS. 5(A) and 5(B).

Figure 4A:
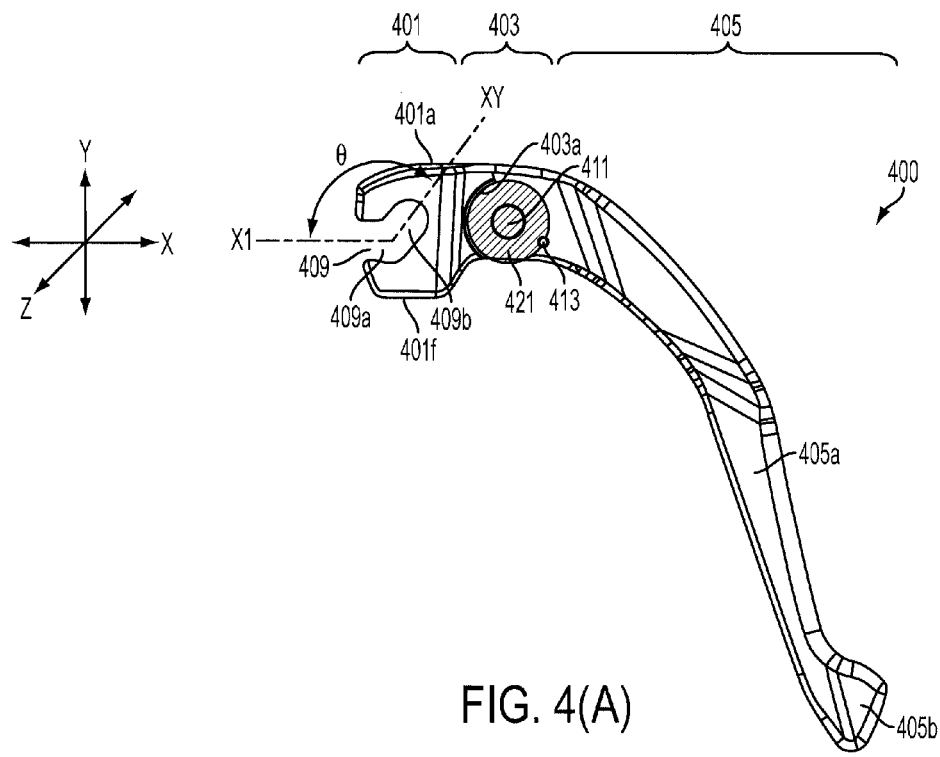
FIGS. 4(A) and 4(B) are schematic views of a control lever of the control apparatus of FIGS. 1(A) and (B)
Figure 4B:
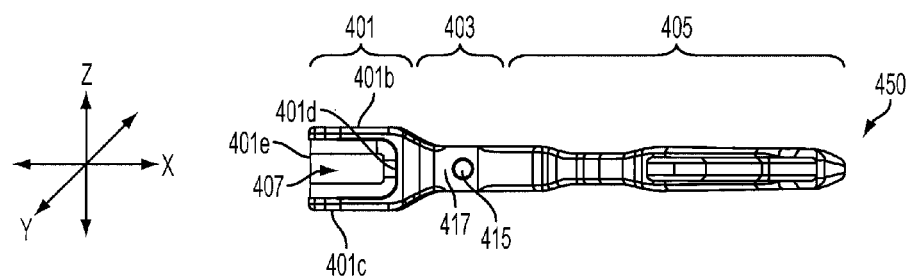

Averting to FIGS. 4(A) and 4(B), there is illustrated a schematic view 400 and a schematic view 450 of control lever 103, which roughly forms a backwards "J" shape. Control lever 103 includes an engagement portion 401, a pivot portion 403, and an operation portion 405. According to one embodiment, engagement portion 401 has a shell-like structure having exterior façades 401a, 401b, and 401c substantially enclosing a cavity region 407 having an inner surface 401d. In this manner, façades 401a-401c terminate at corresponding edges, which together form a peripheral edge 401e of control lever 103. Similarly, façades 401b and 401c, in conjunction with inner surface 401d, terminate at corresponding edges, which together form a peripheral edge 401f of control lever 103. A trace of peripheral edges 401e and 401f defines a boundary edge of an opening to cavity region 407.

Façades 401b and 401c further include corresponding guide slots 409 formed therein. Guide slots 409 roughly define backwards "L" shapes. That is, guide slots 409 include entrance portions 409a extending from peripheral edge 401e towards inner surface 401d along an imaginary axis X1; however, at a first predefined distance, entrance portions 409a bend into trailing portions 409b extending toward façade 401a along an imaginary axis XY, at a second predefined distance. In this manner, imaginary axes X1 and XY form an angle θ, such as an obtuse angle. As such, engagement portion 401, via cavity 407 and guide slots 409, is configured to accept a cable hook assembly 117 (hereinafter "hook assembly 117"), as seen in FIGS. 2 and 3.

Referring back to FIGS. 2 and 3, hook assembly 117 includes a cylindrical-like main body 117a having a through-hole 117b formed therein and configured to accept a cable (not shown), such as a brake cable. Main body 117a is positioned via bearings 117c and 117d, which are in turn supported at a distal end 103b of control lever 103. In this manner, main body 117a, as well as bearings 117c and 117d, are conically centered about an imaginary axis Z2 (hereinafter "center axis Z2") parallel to the imaginary Z-axis. Furthermore, through-hole 117b may be conically centered about an imaginary axis X2 (hereinafter "center axis X2") parallel to an imaginary X-axis.

Averting to FIGS. 4(A) and 4(B), pivot portion 403 of control lever 103 includes through-holes 411 and 413, as well as an internally threaded blind-hole 415. Through-hole 411 is configured to accept pin 109, while distal ends of through-hole 413 are configured to accept trailing portions of torsion springs 113a and 113b. In association with through-hole 413, a recessed contour 403a may be provided in pivot portion 403 to help support torsion springs 113a and 113b. Pivot portion 403 further includes blind-hole 415 extending from a façcade 417 into through-hole 411. Blind-hole 415 is configured to accept fixing screw 111. Control lever 103 also includes operation portion 405, which has a contoured shaft 405a terminating at a knob-like end 405b.

Referring back to FIGS. 1-3, bracket assembly 101 also includes a substantially cylindrical protrusion 101c having a tapered portion 101d, and an inlet opening 101e conically centered about center axis X2. Inlet opening 101e is configured to accept a distal end of a tubular portion 105a of expanding bolt 105. Expanding bolt 105 also includes a tapered portion 105b. An expandable ring 119 biases fixing members 107 against expanding bolt 105. As such, when expanding bolt 105 is detachably coupled to a fixing nut 121 of bracket assembly 101, an inner surface of fixing members 107 may simultaneously abut against an outer surface of tubular portion 105a, an outer surface of tapered portion 105b, and an outer surface of tapered portion 101c. In this manner, the outer surfaces of fixing members 107 define a diameter D that is capable of being adjusted, as will be described in more detail with respect to FIGS. 12 and 13. Fixing nut 121 is more fully explained in conjunction with FIGS. 6 and 7, while more specific details concerning expanding bolt 105 are delineated in accordance with FIGS. 8(A) and 8(B).

Figure 5A:
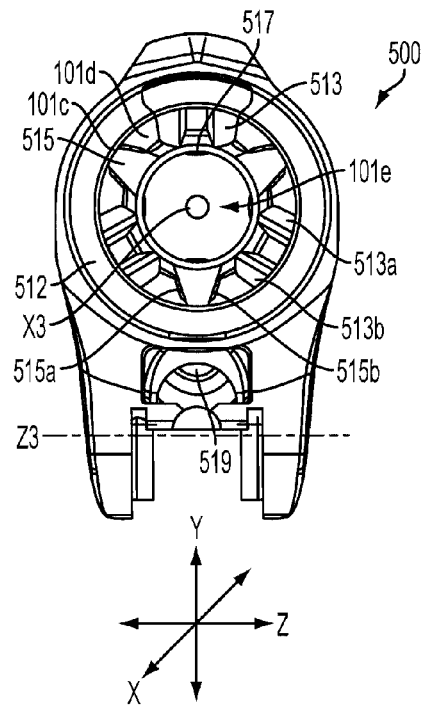
FIGS. 5(A) and 5(B) are schematic views of a bracket assembly of the control apparatus of FIGS. 1(A) and 1(B)
Figure 5B:
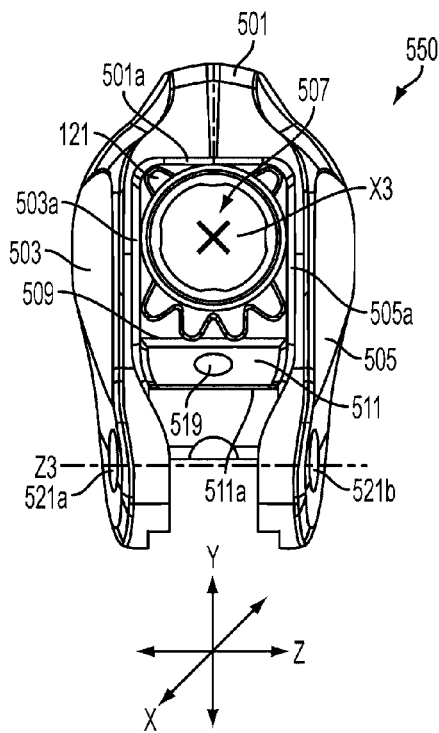
Figure 9:
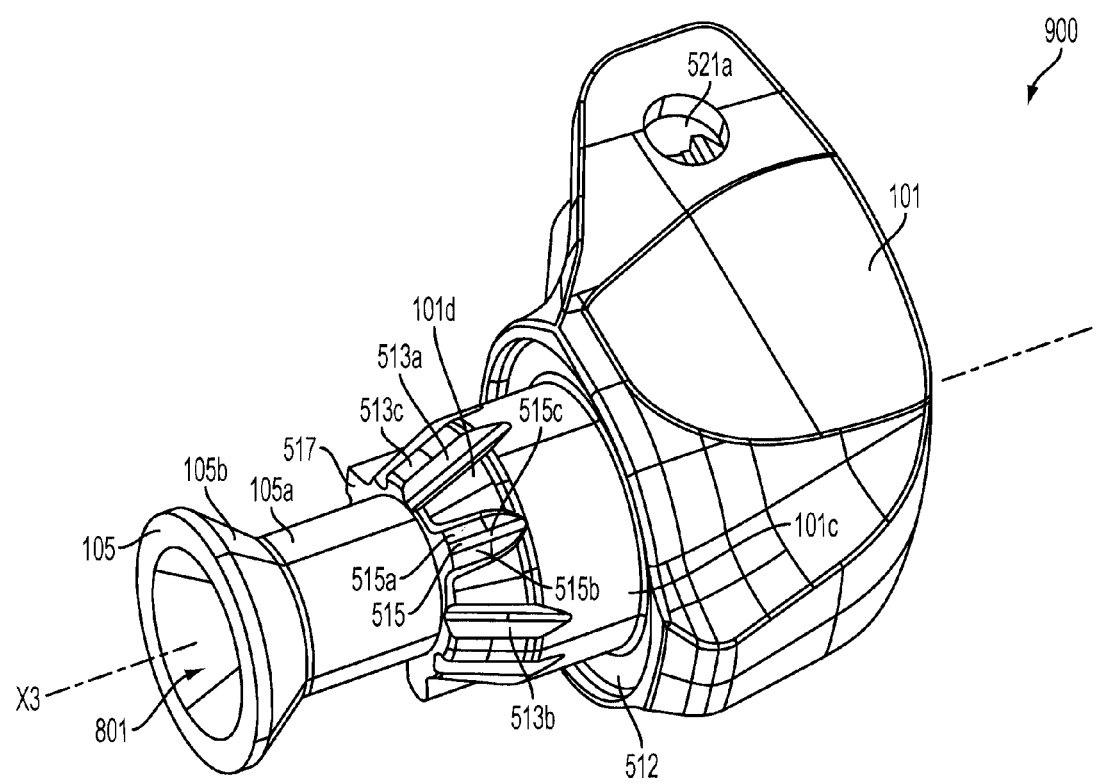
FIG. 9 is a perspective schematic view of the expanding bolt of FIGS. 8(A) and 8(B) coupled to the bracket assembly of FIGS. 5(A) and 5(B)

Referring now to FIGS. 5(A), 5(B), and 9, there is shown a schematic view 500, a schematic view 550, and a perspective schematic view 900 of bracket assembly 101, according to an embodiment of the present invention. In one implementation, bracket assembly 101 includes a shell-like structure having exterior façades 501, 503, and 505 substantially enclosing a cavity region 507 having an inner surface 509 terminating at a slanted inner surface 511 at a distal end 511a. Slanted inner surface 511 is configured parallel to an imaginary plane intersecting with an imaginary XZ plane in an imaginary Y-axis direction, but not in the imaginary X-axis direction. In this manner, façades 501, 503, and 505 terminate at corresponding edges 501a, 503a, and 505a, which together form a peripheral edge of an opening to bracket assembly 101. This opening permits a first directional access to cavity region 507, while inlet opening 101e provides a second directional access to the same. It is noted that distal end 511a of slanted inner surface 511 is recessed from the peripheral edge defined by edges 501a, 503a, and 505a. Accordingly, fixing nut 121 may be slidably inserted into cavity region 507, such that the outer most edges of fixing nut 121 abut against the inner surfaces of façades 501, 503, and 505, as well as against inner surface 509, such that fixing nut 121 may be conically centered about an imaginary axis X3 (hereinafter "center axis X3") parallel to the imaginary X-axis. It is noted that fixing nut 121 and expanding bolt 105 may be formed from a different material than bracket assembly 101. According to one embodiment, a substantial portion of bracket assembly 101 may be formed using a relatively light weight material, such as aluminum, or a relatively light weight composite material, such as carbon fiber. In this manner, fixing nut 121 and/or expanding bolt 105 may be formed using a relatively dense material, such as iron. According to other embodiments, material alloys may be utilized. It is further noted that the aforementioned materials are merely exemplary and are not intended to limit the nature or structure of bracket assembly 101, expanding bolt 105, or fixing nut 121.

As previously described, bracket assembly 101 includes protrusion 101c protruding from a wall 512 and extending along center axis X3. At a distal end, protrusion 101c includes tapered portion 101d tapering towards center axis X3. Tapered portion 101d also includes one or more axially directional serrations 513 and one or more axially directional protrusions 515 formed upon the exterior surface of tapered portion 101d. Alternatively, or additionally, tapered portion 101d may include other exterior surface features, such as axially directional slots, splines, ridges, bumps, dimple patterns, or polygonal flat surfaces formed upon (or within) the exterior surface of tapered portion 101d.

In the depicted embodiment, axially directional serrations 513 protrude in radial directions from an outer surface of tapered portion 101d in trapezoidal prism-like formations having façades 513a and 513b extending along corresponding directions intersecting with respect to the axial direction defined by center axis X3. Serrations 513 also include façades 513c extending along the axial direction. In this manner, façades 513c are tapered substantially parallel to tapered portion 101d, such that a first set of edges of serrations 513 terminate at a peripheral edge 517, while a second set of edges of serrations 513 blend into protrusion 101c. It is noted that peripheral edge 517 defines inlet opening 101e, conically centered about center axis X3.

Also shown in the depicted embodiment, are axially directional protrusions 515 having façades 515a and 515b, extending in radial directions from tapered portion 101d, and bending into façades 515c. In this manner, protrusions 515 roughly form upside down "U" shapes. It is noted that the outer surfaces of façades 515c are axially flush with the outer surface of protrusion 101c, such that the edges of protrusions 515 terminate at peripheral edge 517. In other words, protrusions 515 are not axially tapered in the depicted embodiment; however, are not so limited.

With continued reference to FIGS. 5(A) and 5(B), bracket assembly 101 also includes a recessed through-hole 519 (hereinafter "hole 519") extending into inner cavity region 507 from slanted surface 511. Hole 519 includes an inner threaded surface and is configured to accept screw 115. The recess of hole 519 is configured to substantially conceal a head of screw 115, as is more readily understood from FIGS. 1(A) and 2. Bracket assembly 101 further includes through-holes 521a and 521b formed within façades 503 and 505, respectively, and conically centered to an imaginary axis Z3 (hereinafter "center axis Z3") parallel to the imaginary Z-axis. As such, through-holes 521a and 521b are configured to accept and support two bearings (not shown), which in turn accept and support pin 109. These bearings are illustrated as components 1150a and 1150b of FIG. 11.

Accordingly, when bracket assembly 101 is joined within an assembly of control apparatus 100, center axis X3 is made contiguous with center axis X2, as can be seen in FIGS. 1-3. Similarly, center axis Z3 is made contiguous with center axis Z1.

Figure 6:
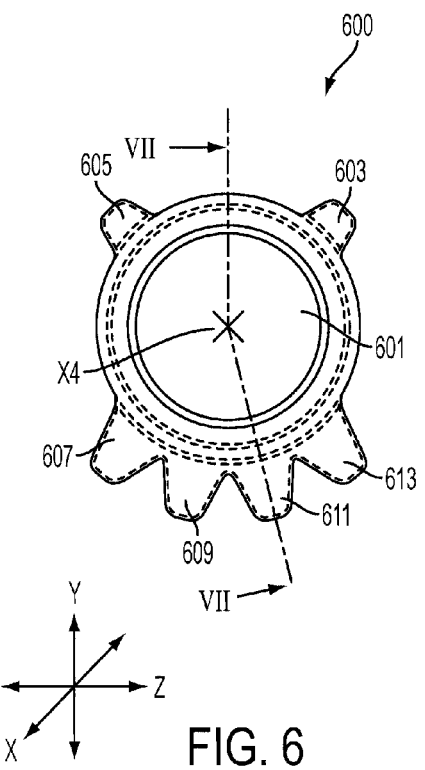
FIG. 6 is a schematic view of a fixing nut of the bracket assembly of FIG. 5(B)
Figure 7:
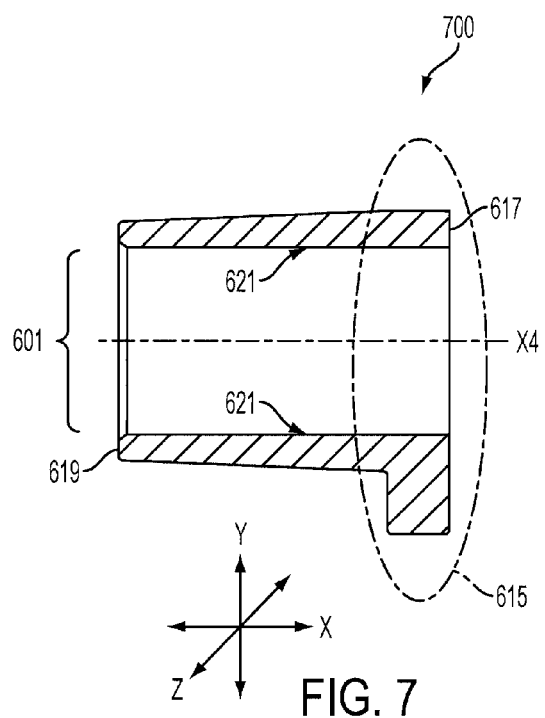
FIG. 7 is a sectional view of the fixing nut of FIG. 6 taken along a line VII-VII.

Fixing nut 121 of bracket assembly 101 will now be described in conjunction with to FIGS. 6 and 7. As shown, FIGS. 6 and 7 illustrate a schematic view 600 and a sectional view 700 of fixing nut 121, according to an embodiment of the present invention. In one implementation, fixing nut 121 includes an inner bore 601 and a plurality of protrusions 603, 605, 607, 609, 611, and 613 formed within a distal end 615 of fixing nut 121. In this manner, fixing nut 121 roughly forms a cylindrical tube conically centered about an imaginary axis X4 (hereinafter "center axis X4") parallel to the imaginary X-axis. Fixing nut 121 exhibits a slight axial taper from a façade 617 to a façade 619. Bore 601 is a single diameter bore conically centered to center axis X4. Further, bore 601 includes an inner threaded surface 621 configured to accept the distal tubular end 105a of expanding bolt 105.

According to one embodiment, protrusions 603-613 extend in various radial directions from an outer surface of distal end 615 and roughly form upside down "U" shapes. Protrusions 603 and 605 are of a first size, while protrusions 607-613 are of a second size; however, embodiments of protrusions 603-613 are no so limited. As such, when fixing nut 121 is inserted into bracket assembly 101, protrusion 605 is configured to abut against the inner surfaces of façades 501 and 503 of bracket assembly 101, while protrusion 603 is configured to abut against the inner surfaces of façades 501 and 505. Similarly, protrusions 607 and 613 are formed to abut against the inner surfaces of façades 503 and 505, respectively, while protrusions 609 and 611 are formed to abut against inner surface 509. As such, protrusions 603-613 axially center fixing nut 121 to center axis X3 when fixing nut 121 is inserted into bracket assembly 101. That is, center axis X4 is made contiguous with center axis X3. Furthermore, protrusions 603-613 prevent fixing nut 121 from rotating about center axis X2 when expanding bolt 105 is screwed into bore 601.

Figure 8A:
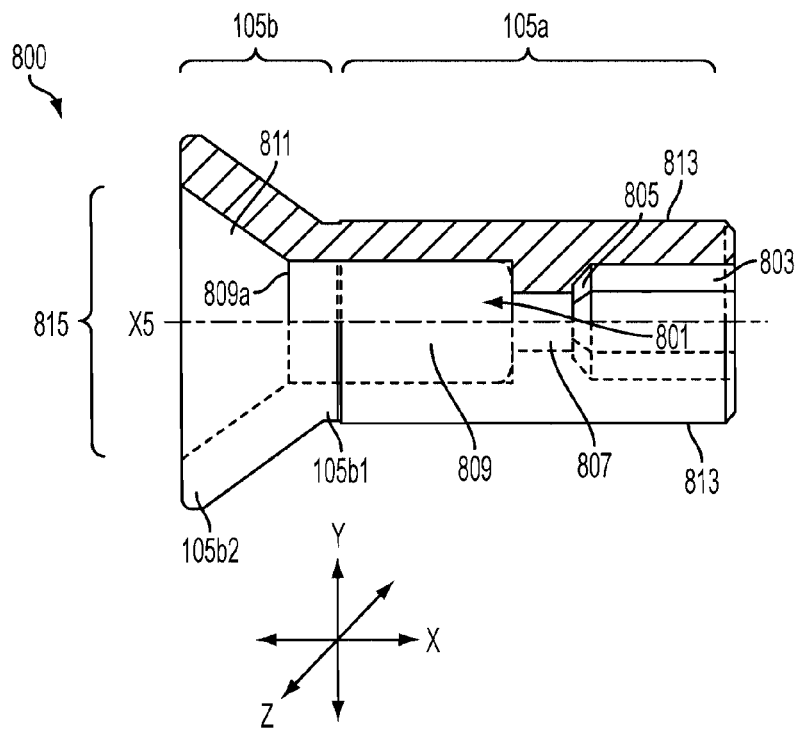
FIG. 8(A) is a schematic view, partly in section, of an expanding bolt of the control apparatus of FIG. 1(A)
Figure 8B:
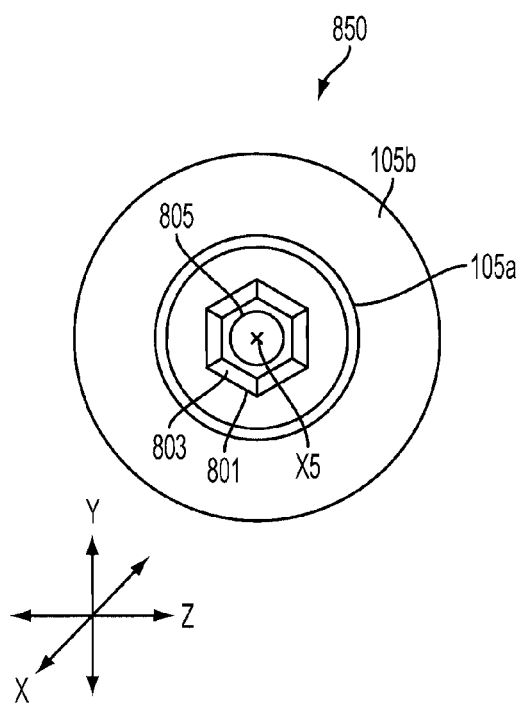
FIG. 8(B) is a schematic view of the expanding bolt of FIG. 8(A)

Averting to FIGS. 8(A), 8(B), and 9, a more detailed description of expanding bolt 105 will be provided. In the depicted exemplary embodiments, FIGS. 8(A), 8(B) and 9 illustrate a schematic view 800, partly in section, a schematic view 850, and a perspective schematic view 900 of expanding bolt 105. According to one embodiment, expanding bolt 105 has a cylindrical-like shape including a tubular portion 105a and a tapered portion 105b, as well as a central axial bore 801 divided into various bore sections, such as bore sections 803, 805, 807, 809, and 811. Each of the various features of expanding bolt 105 are conically centered about an imaginary axis X5 (hereinafter "center axis X5") parallel to the imaginary X axis; however, are not so limited.

Tubular portion 105a has an outer threaded surface 813 configured to coincide with the inner threaded surface 621 of fixing nut 121. In this manner, a portion of the distal end of tubular portion 105a may be "screwed" into fixing nut 121. The axial juxtaposition of expanding bolt 105 and fixing nut 121 form an adjustment mechanism for varying diameter D of FIG. 2, as will be more readily apparent from the description of FIG. 13. Tapered portion 105b protrudes from tubular portion 105a at a first end 105b1, and has an axially expanding diameter terminating at a second end 105b2. The tubular portion 105a and the tapered portion 105b being integrally joined as a one-piece unitary structure in the embodiments shown in FIGS. 2 and 8(A).

Central axial bore 801 is configured to permit portions of a cable (not illustrated), such as a brake cable, to pass through expanding bolt 105. Namely, central axial bore 801 enables the cable to pass from an inlet opening 815 of expanding bolt 105, through fixing nut 121, to hook assembly 117. In this manner, central axial bore 801 includes an inlet bore section 811 at a first end. Inlet bore section 811 axially tapers from a first diameter defined by inlet opening 815 to a second diameter defined by an opening 809a of a first cylindrical bore section 809.

Cylindrical bore section 809 axially extends into tubular portion 105a from a distal end of tapered portion 105b and is configured to support a first end of a conventional cable guide (not shown). The cable guide provides a path from, for instance, a conventional bicycle brake system (not shown) to the cylindrical bore section 809, wherein a portion of the previously mentioned cable passes through an interior bore of the cable guide on route from, for example, the conventional bicycle brake system, to hook assembly 117.

At a second end, central axial bore 801 includes an interface bore section 803, such as a hexagonal bore, configured to accept a tool, such as a hex key, i.e., an Allen wrench, for "screwing" expanding bolt 105 into fixing nut 121. While the depicted embodiment illustrates a hexagonal bore configuration, alternative embodiments of interface bore section 803 may include other polygonal bore configurations, such as slotted, square, crosshead, pozidrived, six-point stared, interlocking rib slotted, or triple squared formations, as well as any other suitable tool interface.

At a distal end, interface bore section 803 includes a tapered bore section 805 in communication with a second cylindrical bore section 807 that completes the central axial bore path from the first cylindrical bore section 809 to the tool interface bore section 803.

While the various sections of central axial bore 801 are shown having various diameters, embodiments of expanding bolt 105 are not so limited. For instance, central axial bore 801 may exist as a single diameter bore or may be divided into alternatively sectioned bore arrangements; however, particular advantages of the depicted embodiments will become more readily apparent, as the same is explained in connection with FIGS. 13 and 14. Accordingly, when expanding bolt 105 is "screwed" into fixing nut 121 of bracket assembly 101, central axis X5 of expanding bolt 105 is made contiguous with central axis X3 of bracket assembly 101.

Figure 10A:
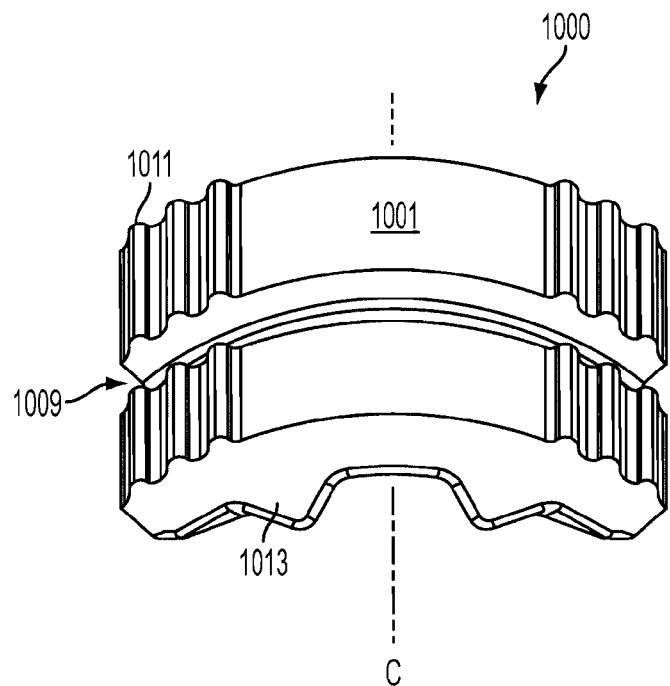
FIGS. 10(A) and 10(B) are perspective schematic views of a fixing member of the control apparatus of FIG. 1(A)
Figure 10B:
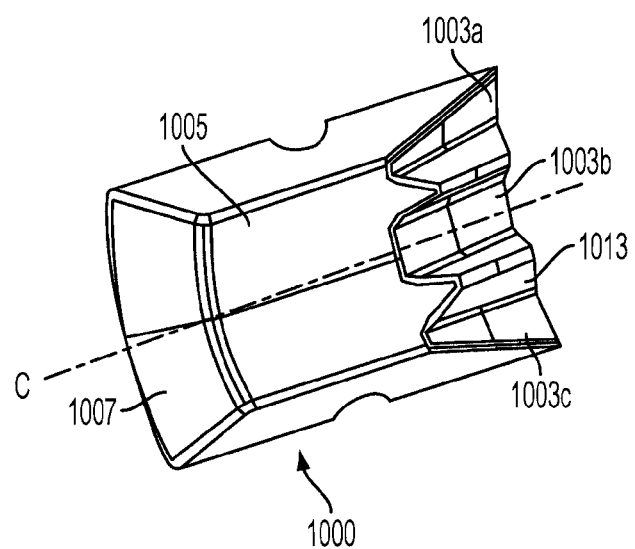

Referring to FIGS. 10(A) and 10(B), a more detailed description of a fixing member 107 of control apparatus 100 is provided, according to various exemplary embodiments. As shown, fixing member 107 includes a main body region 1000 (hereinafter "body 1000") symmetrically formed about an imaginary axial center line C; however, is not so limited. Body 1000 has an outer surface 1001 and one or more inner surfaces, such as inner surfaces 1003a-1003c, 1005, and 1007. A channel 1009 is formed within outer surface 1001 and is configured to accept expandable ring 119, such that one or more fixing members 107 may be biased against expanding bolt 105 via expandable ring 119, as can be seen in, for example, FIG. 1(A).

Fixing member 107 also includes one or more first axially directional serrations, e.g., serration 1011 (hereinafter "outer serrations 1011"), formed on outer surface 1001. In the depicted embodiment, outer 1001 includes twelve outer serrations 1011 roughly forming upside down "U" shapes, wherein opposing ends of outer surface 1001 includes six outer serrations 1011 each. It is noted; however, that outer surface 1001 may include any number (or form) of outer serrations 1011. For example, outer surface 1001 may include other exterior surface features, such as axially directional slots, splines, ridges, bumps, dimple patterns, or polygonal flat surfaces formed upon (or within) outer surface 1001.

Moreover, fixing member 107 includes one or more second axially directional serrations, e.g., serration 1013 (hereinafter "inner serrations 1013"), formed on a first inner surface of body 1000. The first inner surface of body 1000 is defined by surfaces 1003a, 1003b, and 1003c. In the depicted embodiment, two inner serrations 1013 are shown, roughly forming triangular prism-like shapes. It is noted; however, that any number (or form) of inner serrations 1013 may be provided. As with outer serrations 1011, inner serrations 1013 may, for example, include other interior surface features, such as axially directional slots, splines, ridges, bumps, dimple patterns, or polygonal flat surfaces formed upon (or within) the first inner surface of fixing member 107.

With additional reference to FIG. 9, inner serrations 1013 are correspondingly configured to engage with at least one of the axially directional serrations 513 of bracket assembly 101. In this manner, a second inner surface 1005 of fixing member 107 is formed to abut against the outer surface of tubular portion 105a of expanding bolt 105, while a third inner surface 1007 is formed to abut against the outer surface of tapered portion 105b. It is noted that fixing member 107 may be manufactured of materials, such as metals, polymers, composites, and the like. According to one embodiment, fixing member 107 is particularly formed using a resilient material, such as a natural or synthetic rubber.

Exemplary processes for assembling control apparatus 100 will now be described, along with various particular advantages. It is noted that additional advantages and other features of control apparatus 100 will be apparent to those having ordinary skill in the art upon examination of the same, or may be learned from the practice of various exemplary embodiments.

Averting to FIG. 11, there is schematically illustrated a process for assembling control lever 103 to bracket assembly 101, according to an exemplary embodiment. At step 1101, bearings 1150a and 1150b may be inserted into corresponding through-holes 521a and 521b of the shell-like structure of bracket assembly 101 (hereinafter "bracket 101"). In particular embodiments, bearings 1150a and 1150b include solid journal bearings, ball bearings, roller bearings, thrust bearings, or needle bearings, as well as any other suitable bearing device. Consequently, bearings 1150a and 1150b advantageously permit smooth, low-friction rotary movement of control lever 103 about center axis Z1.

Per step 1103, screw 115 may be "screwed" into hole 519 of bracket 101, such that a trailing end of screw 115 protrudes into inner cavity region 507 of bracket 101, via slanted surface 511. As previously mentioned, by adjusting the amount by which screw 115 protrudes into inner cavity region 507, the resting position of control lever 103 may be advantageously defined and/or modified. Namely, adjusting this protrusion amount may enable the resting position of control lever 103 to be customized on a per user basis; for instance, to "fit" the size of a hand of a bicycle rider.

In step 1105, fixing nut 121 may be slidably inserted (from façade 619) into inner cavity region 507, via an opening to bracket 101 defined by peripheral edges 501a, 503a, and 505a. Accordingly, the formation of protrusions 603-613 of fixing nut 121 advantageously enables fixing nut 121 to be "self-aligned" to center axis X3 of bracket 101 when fixing nut 121 is slidably inserted into inner cavity region 507. More specifically, center axis X4 of fixing nut 121 is, without additional effort, made contiguous with center axis X3 of bracket 101. This "self-centering" effect helps to prevent cross-threading between expanding bolt 105 and fixing nut 121 when expanding bolt 105 is "screwed" into fixing nut 121. Furthermore, protrusions 603-613 prevent fixing nut 121 from rotating about center axis X3 when expanding bolt 105 is "screwed" into fixing nut 121.

At step 1107, torsion springs 113a and 113b, as well as hook assembly 117, may be joined to control lever 103. In particular, the trailing portions of torsion springs 113a and 113b can be slidably inserted into distal ends of through-hole 413 of control lever 103. Recessed contour 403a advantageously provides additional support for torsion springs 113a and 113b, as well as prevents torsion springs 113a and 113b from becoming dislodged during, for example, installation procedures.

Further, hook assembly 117 can be slidably inserted into entrance portions 409a to guide slots 409 of control lever 103. In particular, bearings 117c and 117d are slidably joined to main body 117a, and support main body 117a between guide slots 409. As such, main body 117a can be suspended in cavity region 407 of control lever 103. According to various embodiments, bearings 117c and 117d include solid journal bearings, ball bearings, roller bearings, thrust bearings, or needle bearings, as well as any other suitable bearing device. In this manner, bearings 117c and 117d advantageously permit smooth, low-friction rotary movement of hook assembly 117 within entrance portions 409a. Consequently, when control lever 103 is compressed, i.e., pivoted in a clockwise fashion about center axis Z1, through-hole 117b of hook assembly 117 may remain axially centered about center axis X2, as is more readily apparent in step 1301 of FIG. 13. Moreover, as main body 117a rotates about the center axis Z2 of bearings 117c and 117d, i.e., when control lever 103 is compressed, hook assembly 117 remains within entrance portion 409a of guide slot 409.

Next, the resulting assembly of step 1107 may be inserted into the resulting assembly of step 1105, per step 1109. In this manner, control lever 103 is inserted into cavity region 507 of bracket 101 via the previously mentioned opening to bracket 101. When installed in this fashion, torsion springs 113a and 113b, as well as through-hole 411 of control lever 103, can be axially centered about center axis Z1. Furthermore, trailing bent ends 113c and 113d of torsion springs 113a and 113b, respectively, may abut against corresponding interior contours (not shown) of bracket 101. As such, torsion springs 113a and 113b can be anchored between control lever 103 and bracket 101 to advantageously bias control lever 103. Consequently, when control lever 103 is compressed, torsion springs 113a and 113b create an apposing counterclockwise torsion force that returns control lever 103 to a resting position when, for example, control lever 103 is released.

At step 1111, pin 109 may be inserted into through-hole 521b, for example, such that pin 109 may sequentially pass through bearing 1150b, torsion spring 113b, through-hole 411, torsion spring 113a, bearing 1150a, and through-hole 521a. According to one embodiment, when pin 109 is suitably installed, distal ends of pin 109 are made flush with one or more façades of bracket 101, i.e., façades 503 and/or 505. Additionally (or alternatively), when pin 109 is suitably installed, distal ends of pin 109 may be recessed within façades 503 and/or 505. Fixing screw 111 may be "screwed" into blind-hole 415 of control lever 103, such that fixing screw 111 may secure pin 109 in place. In this manner, control lever 103 may freely pivot about pin 109, in a circumferential direction towards bracket 101. As previously mentioned, bearings 1150a and 1150b help ensure smooth, low-friction rotary motion, while torsion springs 113a and 113 bias control lever 103 to a resting position.

Referring now to FIG. 12, an exemplary process is schematically illustrated for mounting one or more fixing members 107, via expanding bolt 105 and expanding ring 119, to the assembly of FIG. 11. At step 1201, one or more fixing members 107 may be positioned about an outer surface of tubular portion 105a of expanding bolt 105. Expandable ring 119 may then be "fit" over the one or more fixing members 107 and positioned within channels 1009 of the corresponding body portions 1001. As such, expandable ring 119 may preferably bias fixing members 107 against the tubular portion 105a of expanding bolt 105. The resulting assembly 1250 of step 1201 is of a cylindrical-like shape having a maximum diameter D defined by the outer most circumferential surface of fixing members 107.

Per step 1203, a distal end of assembly 1250, i.e., tubular portion 105a of expanding bolt 105, can be inserted into inlet opening 101e of bracket 101 until the distal end comes in contact with fixing nut 121. At this point, assembly 1250 may be "screwed" into fixing nut 121 until at point just before inner serrations 1013 of fixing members 107 engage with the axially directional serrations 513 of bracket 101. Consequently, the result of step 1203 is the control apparatus 100 of FIG. 1.

Figure 13:
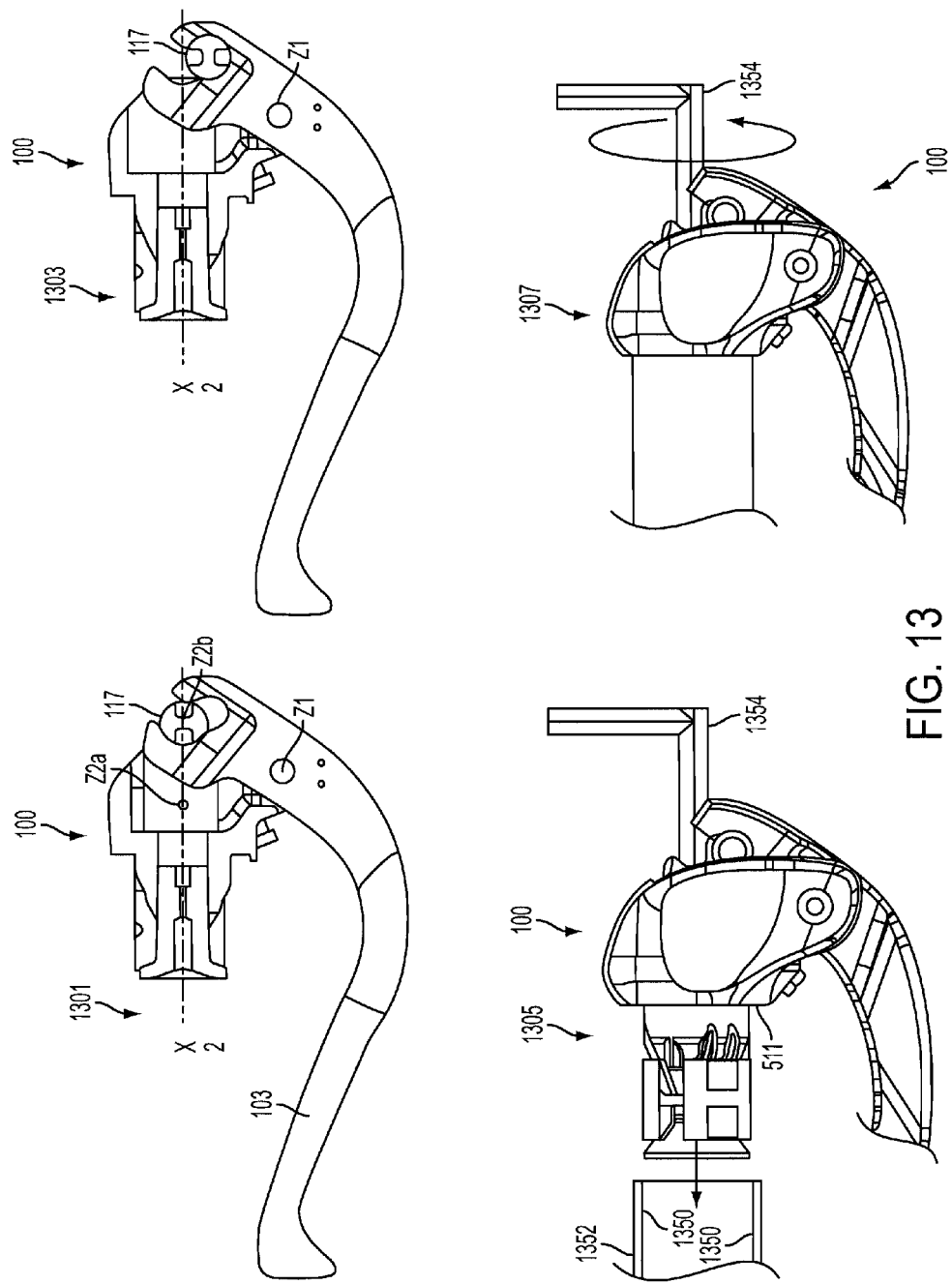
FIG. 13 schematically illustrates a process for mounting the assembly of FIG. 12 to a bicycle handlebar.

Averting to FIG. 13, an exemplary processed is schematically illustrated for mounting control apparatus 100 to an inner surface 1350 of a tubular member 1352, such as a bicycle handlebar. At step 1301, control lever 103 of control apparatus 100 may be compressed, i.e., pivoted in a clockwise fashion about center axis Z1. As previously mentioned, when control lever 103 pivots towards center axis X2, hook assembly 117 rotates about central axis Z2, such that hook assembly 117 remains within entrance portions 409a of guide slots 409 included as part of control lever 103. In this manner, central axis Z2 axially propagates along center axis X2 from a "resting" position Z2a to a "comprised" position Z2b. As such, through-hole 117b of hook assembly 117 may substantially remain axially centered about center axis X2.

Per step 1303, hook assembly 117 may be forced, e.g., slid, into trailing portions 409b of guide slots 409, advantageously providing access to interface bore section 803 (hereinafter "bore 803"), such as a hexagonal bore, of expanding bolt 105. At step 1305, a tool 1354, such as a hex key, may be slidably inserted into bore 803. Since bore 803 is of a larger diameter than the second cylindrical bore section 807 (hereinafter "bore 807") of expanding bolt 105, a distal end of tool 1354 may be advantageously prevented from traversing any further than bore 803.

While not illustrated, just before a distal end of control apparatus 100 is inserted into tubular member 1352, a first distal end of a cable guide, such as a conventional brake cable guide, may be slidably inserted into the first cylindrical bore section 809 (hereinafter "bore 809") of expanding bolt 105, via inlet opening 815. In this manner, the tapered inner surface of inlet bore section 811 of expanding bolt 105 serves to seamlessly channel the cable guide into bore 809. Furthermore, since bore 809 is of a larger diameter than bore 807, the distal end of the cable guide may be advantageously prevented from traversing any further than bore 809. It is noted that a second distal end of the cable guide may be thread through tubular member 1352 and installed to a corresponding structure, such as a conventional bicycle brake system.

After inserting the first distal end of the cable guide into bore 809, a distal end of control apparatus 100 may be inserted into tubular member 1352 up to wall 512 of bracket 101. Per step 1307, expanding bolt 105 may be further "screwed" into fixing nut 121 via tool 1354, such that inner serrations 1013 of fixing members 107 may engage with the axially directional serrations 513 of bracket 101. After these serrations engage with one another, fixing members 107 will be prevented from rotating with expanding bolt 105 as expanding bolt 105 is still further "screwed" into fixing nut 121. As tapered portion 105b of expanding bolt 105 draws closer to tapered portion 101d of bracket 101, inner surfaces 1003a-1003c and 1007 of fixing members 107 will be forced in a substantially radial direction from center axis X2, thereby increasing diameter D of assembly 1250. Continuing this process causes outer serrations 1011 and/or outer surface 1001 of fixing members 107 to be "pushed" against inner surface 1350 of tubular member 1352. It is noted that if fixing members 107 are manufactured of a resilient material, as fixing members are "pushed" against inner surface 1350, fixing members 107 may advantageously provide an increased form fitment. In this manner, control apparatus 100 may be mounted, i.e., compression fit, to inner surface 1350 of a distal end of tubular member 1352. Expanding bolt 105 may be "screwed" into fixing nut 121 to a desired torque setting (which will be proportional to the compression force by which fixing members 107 are pushed against inner surface 1350), or until apparatus 100 is sufficiently secured to tubular member 1352. Consequently, the fixing force, e.g., the compression force, may be advantageously enhanced and/or modified, via expanding bolt 105, so as to sufficiently secure apparatus 100 to tubular members 1352 of various configurations, e.g., sizes, cross-sections, materials, etc.

Figure 14:
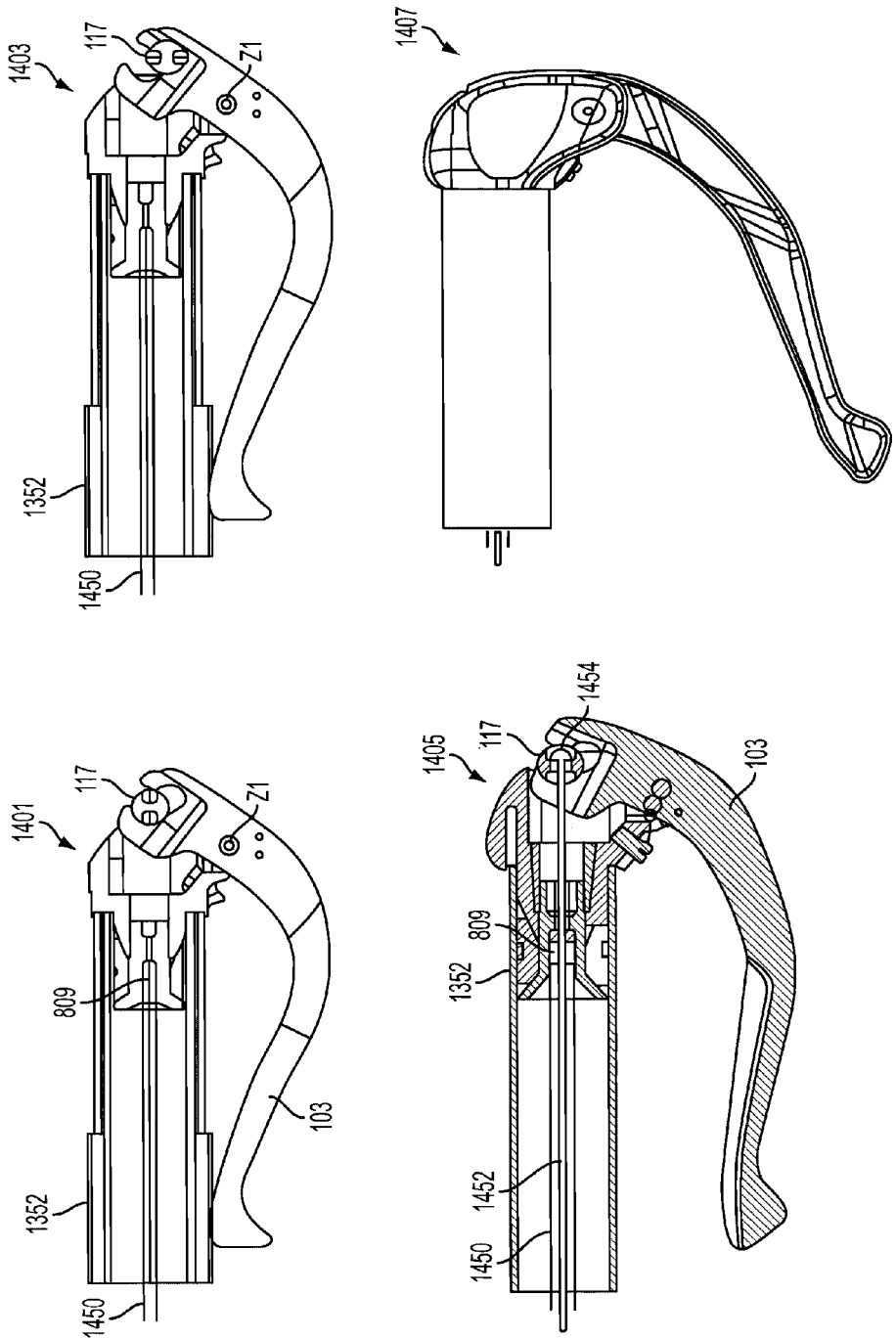
FIG. 14 schematically illustrates a process for coupling a cable to the assembly of FIG. 13.

Referring to FIG. 14, an exemplary process is schematically illustrated for coupling a cable 1452, such as a brake cable, between control apparatus 100 (being mounted to an inner surface 1350 of a tubular member 1352, such as a bicycle handlebar) and a corresponding system, such as a conventional bicycle brake system. At step 1401, control lever 103 of control apparatus 100 may be compressed, i.e., pivoted in a clockwise fashion about center axis Z1, thereby exposing cable hook assembly 117. As previously mentioned, when control lever 103 pivots towards center axis X2, hook assembly 117 rotates about central axis Z2 in a manner that prevents hook assembly 117 from being displaced from entrance portions 409a of guide slots 409 included as part of control lever 103. Thus, to gain access to an inner bore of a conventional cable guide 1450 that is detachably coupled to bore 809 of expanding bolt 105, hook assembly 117 may be forced, e.g., slid, into trailing portions 409b of guide slots 409, per step 1403.

In this manner, a first distal end of cable 1452 may be sequentially thread through an opening of bracket 101, fixing nut 121, and expanding bolt 105, to thereby enter the inner bore of cable guide 1450, per step 1405. As such, the first distal end of cable 1452 may be further thread through cable guide 1450 and be installed to a corresponding system, such as a conventional bicycle brake system. A second distal end of cable 1452 may be thread through hook assembly 117, via through-hole 117b, and detachably coupled to main body 117a, via a conventional cable anchor 1454. At this point, hook assembly 117 may be forced, e.g., slid, into entrance portions 409a of guide slots 409. In step 1407, control lever 103 is released. As such, by compressing or releasing control lever 103, a tension within cable 1452 may increase or decrease. Variation of this tension manipulates the conventional brake system.

Although a bicycle brake control apparatus is described in the above embodiment, the present invention can be applied to other apparatuses. For example, the present invention can be applied to a derailleur system. In the derailleur system, a control lever of the derailleur system is mounted to a bicycle handle bar via the device according to an embodiment of the present invention.

In the proceeding description, the present invention is described with reference to specifically exemplary embodiments thereof. It will, however, be evident that various modifications and changes may be made thereto without departing from the broader spirit and scope of the present invention, as set forth in the appended claims. The specification and drawings are, accordingly, to be regarded as illustrative and not as restrictive. It is understood that the present invention is capable of using various other combinations and embodiments, and is capable of any changes or modifications within the scope of the inventive concept as expressed herein. It is also understood that within the scope of the appended claims, the invention may be practiced otherwise than as specifically described herein.

What is claimed as new and is desired to be secured by Letters Patent of the United States is:

1. A device to mount a control lever to a bicycle handlebar, the device comprising:
   a bracket configured to be connected to the control lever and having an inlet opening with a center axis, a first tapered portion extending along the axial direction, and at least one tapered outer serration being formed on the first tapered portion;
   an expanding bolt having a tubular portion and a second tapered portion extending along the axial direction, the tubular portion having an outer threaded surface, the tubular portion and the second tapered portion being integrally joined as a one-piece unitary structure; and
   a fixing member disposed on the tubular portion of the expanding bolt,
   wherein the fixing member has at least one inner serration that protrudes radially inwardly from an inner surface of the fixing member to engage with the at least one tapered outer serration of the bracket,
   wherein the first and second tapered portions are configured to operate so as to push the fixing member against an inner surface of the bicycle handlebar when the device is mounted to the bicycle handlebar,
   wherein the fixing member has at least one outer serration formed on an outer surface of the fixing member, and
   wherein the at least one outer serration formed on the outer surface of the fixing member protrudes from the outer surface of the fixing member.

2. The device according to claim 1, wherein the at least one tapered outer serration comprises
   a first tapered surface extending along the axial direction, and
   a second tapered surface extending in a direction intersecting the axial direction.

3. The device according to claim 1, wherein the at least one outer serration formed on an outer surface of the fixing member is configured to contact the inner surface of the handlebar.

4. The device according to claim 1, wherein the expanding bolt has an opening therethrough that extends in the axial direction for an entire length thereof.

5. The device according to claim 4, wherein the opening of the expanding bolt is a central axial bore.

6. The device according to claim 5, wherein the central axis bore is connected to the inlet opening of the bracket to form a cable passage for the control lever.

7. The device according to claim 5, wherein the central axis bore includes a first bore section configured to receive a tool and a second bore section having a diameter smaller than a diameter of the first bore section.

8. The device according to claim 1, wherein the at least one tapered outer serration includes at least one groove that extends within and along an outer tapered surface of the first tapered portion.

9. The device according to claim 1, wherein the at least one outer serration formed on the outer surface of the fixing member extends in a longitudinal direction parallel to an axis of the fixing member.

10. The device according to claim 1, wherein the at least one inner serration formed on the inner surface of the fixing member extends in a longitudinal direction parallel to an axis of the fixing member.

11. A device to mount a control lever to a bicycle handlebar, the device comprising:
    a bracket configured to be connected to the control lever and having an inlet opening with a center axis, a first tapered portion extending along the axial direction, and at least one tapered outer serration being formed on the first tapered portion;
    an expanding bolt having a tubular portion and a second tapered portion extending along the axial direction, the tubular portion having an outer threaded surface, the tubular portion and the second tapered portion being integrally joined as a one-piece unitary structure; and
    a fixing member disposed on the tubular portion of the expanding bolt,
    wherein the fixing member has at least one inner serration that protrudes radially inwardly from an inner surface of the fixing member to engage with the at least one tapered outer serration of the bracket,
    wherein the first and second tapered portions are configured to operate so as to push the fixing member against an inner surface of the bicycle handlebar when the device is mounted to the bicycle handlebar,
    wherein the fixing member has at least one outer serration formed on an outer surface of the fixing member, and
    wherein the at least one outer serration formed on the outer surface of the fixing member extends in a longitudinal direction parallel to an axis of the fixing member.

12. The device according to claim 11, wherein the at least one tapered outer serration comprises
    a first tapered surface extending along the axial direction, and a second tapered surface extending in a direction intersecting the axial direction.

13. The device according to claim 11, wherein the at least one tapered outer serration includes at least one groove that extends within and along an outer tapered surface of the first tapered portion.

14. The device according to claim 11, wherein the at least one inner serration formed on the inner surface of the fixing member extends in a longitudinal direction parallel to an axis of the fixing member.

15. A device to mount a control lever to a bicycle handlebar, the device comprising:
   a bracket configured to be connected to the control lever and having an inlet opening with a center axis, a first tapered portion extending along the axial direction, and at least one tapered outer serration being formed on the first tapered portion;
   an expanding bolt having a tubular portion and a second tapered portion extending along the axial direction, the tubular portion having an outer threaded surface, the tubular portion and the second tapered portion being integrally joined as a one-piece unitary structure; and
   a fixing member disposed on the tubular portion of the expanding bolt,
   wherein the fixing member has at least one inner serration that protrudes radially inwardly from an inner surface of the fixing member towards the bracket to engage with the at least one tapered outer serration of the bracket,
   wherein the first and second tapered portions are configured to operate so as to push the fixing member against an inner surface of the bicycle handlebar when the device is mounted to the bicycle handlebar, and
   wherein the fixing member has at least one outer serration formed on an outer surface of the fixing member.

16. The device according to claim 15, wherein the at least one outer serration formed on the outer surface of the fixing member protrudes from the outer surface of the fixing member.

17. The device according to claim 15, wherein the at least one outer serration formed on the outer surface of the fixing member extends in a longitudinal direction parallel to an axis of the fixing member.

* * * * *